Patented June 27, 1933

1,915,429

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

PARA-HYDROXY-DIARYLAMINE-CARBOXYLIC ACIDS AND PROCESS OF MAKING SAME

No Drawing. Application filed January 28, 1930, Serial No. 424,022, and in Germany January 31, 1929.

The present invention relates to para-hydroxy-diarylamine carboxylic acids corresponding probably to the general formula:

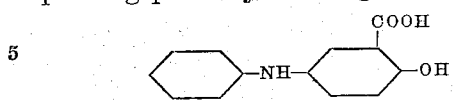

wherein at least one benzene nucleus contains a further mono-valent substituent of the group consisting of alkyl and alkoxy, and to a process of making same.

The process in accordance with this invention comprises treating an alkali metal salt of a 4-hydroxy-diarylamine of the general formula:

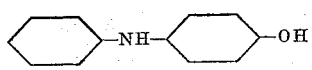

wherein at least one benzene nucleus contains a further monovalent substituent of the group consisting of alkyl and alkoxy but one ortho position to the hydroxy group is free, with carbon dioxid at a raised temperature under pressure.

The position of the carboxylic group entered is not exactly known. But as the new acids react with ferric chloride, it stands probably in an ortho position to the hydroxy group.

The new products are valuable intermediates for the production of dyestuffs.

In order to further illustrate our invention the following examples are given, the parts being by weight and all temperatures in centigrade degrees, but we wish it to be understood that we are not limited to the particular products or reaction conditions mentioned therein.

*Example 1.*—736 parts of 4-hydroxydiphenylamine are dissolved in 260 parts of caustic potash and 1500 parts of water in an autoclave provided with a stirrer. The water is distilled off in vacuo until the formed potassium salt has become entirely dry. Into the cold reaction mass carbon dioxide is introduced until a pressure of 10 atmospheres is attained, and the whole is heated to 150–170° during 16 hours. The cold molten mass is dissolved in hot water and filtered. From this solution the formed carboxylic acid is precipitated by the addition of hydrochloric acid. In order to further purify it, it may be dissolved in water and soda or sodium acetate and then again precipitated with hydrochloric acid. It corresponds probably to the formula

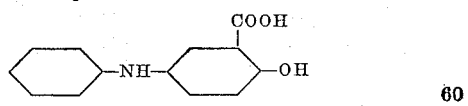

When recrystallized from benzene it melts at 153°. Its alcoholic solution yields when mixed with a dilute solution of ferric chloride a dark blue coloration.

In Ann. vol. 273 page 119 there is described an "anilidosalicylsäure" of the same alleged constitution. Since however this compound shows a different melting point and a different coloration when mixed with ferric chloride, it is not identical with the compound obtainable according to the above example.

*Example 2.*—796 parts of 4-hydroxy-4'-methyldiphenylamine, 260 parts of caustic potash and 1500 parts of water are treated in the manner described in Example 1. The carboxylic acid thus obtained corresponds probably to the formula

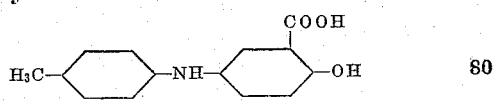

When recrystallized from benzene it melts at 165–166°. Its alcoholic solution becomes dark blue when mixed with ferric chloride.

*Example 3.*—The dry potassium salt of 430 parts of 4-hydroxy-4'-methoxy-diphenylamine, 133 parts of caustic potash and 1000 parts of water are treated with carbon dioxide under pressure as described in Example 1. The new acid thus formed corresponds probably to the formula

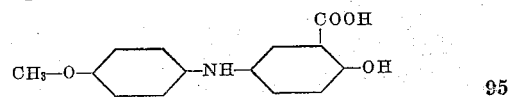

It melts at 144–145° when recrystallized from benzene. Its alcoholic solution yields when mixed with some drops of a solution of ferric chloride a blue coloration.

*Example 4.*—398 parts of 4-hydroxy-3- methyl-diphenylamine (prepared e. g. from toluhydroquinone and aniline), 133 parts of caustic potash and 1000 parts of water yield when treated according to the foregoing examples a new acid of the probable formula:

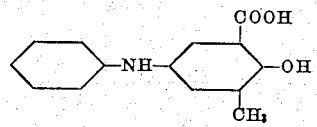

This compound crystallizes from benzene in greenish glittering leaflets of melting point 195–197°. Its alcoholic solution shows when mixed with ferric chloride a blue tint.

*Example 5.*—A mixture of 213 parts of 4-hydroxy-3.4'-dimethyl-diphenylamine (prepared for instance from toluhydroquinone and para-toluidine), 66 parts of caustic potash and 500 parts of water is evaporated until dry and further treated with carbon dioxide as described above. The new acid thus formed crystallizes from benzene in colorless leaflets melting at 207–210°. Its alcoholic solution becomes blue on the addition of ferric chloride. It does not combine with diazo compounds. Thereby the methyl group is proved to have occupied (likewise as supposed in the case of example 4) the 3-position. In accordance to this assumption the product has the hypothetical formula:

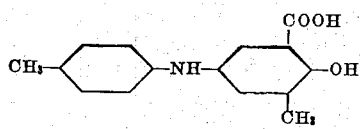

In the same way the process may be carried out by starting from the corresponding sodium salts.

The carboxylic acid obtained by starting from 4-hydroxy-2'-methyl-diphenylamine melts at 139°; the acid obtained from 4-hydroxy-3'-methyl-diphenylamine at 212°.

We claim:

1. A process which comprises treating an alkali metal salt of a 4-hydroxy-diarylamine of the general formula

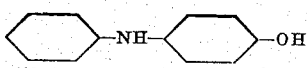

wherein at least one benzene nucleus contains a further monovalent substituent of the group consisting of alkyl and alkoxy, but one ortho-position to the hydroxy group is free with carbon dioxide at a temperature of 150–170° C. and under a pressure of about 10 atmospheres.

2. A process which comprises treating an alkali metal salt of a 4-hydroxy-diarylamine of the general formula

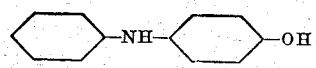

wherein at least one benzene nucleus contains a methyl group, but one ortho-position to the hydroxy group is free with carbon dioxide at a temperature of 150–170° C. and under a pressure of about 10 atmospheres.

3. A process which comprises treating an alkali metal salt of 4-hydroxy-4'-methyl-diphenylamine of the formula

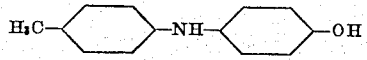

with carbon dioxide at a temperature of 150–170° C. and under a pressure of about 10 atmospheres.

4. As new compounds the 4-hydroxy-diarylamine-carboxylic acids of the probable general formula

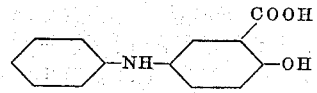

wherein at least one benzene nucleus contains a further monovalent substituent, of the group consisting of alkyl and alkoxy being nearly colorless crystalline substances, having a definite melting point, soluble in organic solvents and in alkalies, difficultly soluble in water, yielding when mixed with a solution of ferric chloride an intense bluish coloration.

5. As new compounds the 4-hydroxy-diarylamine-carboxylic acids of the probable general formula

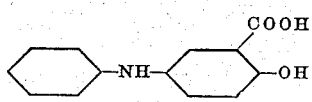

wherein at least one benzene nucleus contains a methyl group, being nearly colorless crystalline substances, having a definite melting point, soluble in organic solvents and in alkalies, difficultly soluble in water, yielding when mixed with a solution of ferric chloride an intense bluish coloration.

6. As a new compond the 4-hydroxy-4'-methyl-diphenyl-aminine-carboxylic acid of the probable formula:

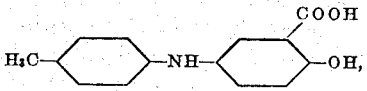

being a nearly colorless crystallized substance, melting when recrystallized from benzene at 165–166°, soluble in organic solvents and in alkalies, difficultly soluble in water, yielding when mixed with a solution of ferric chloride a dark blue coloration.

7. As a new compound the 4-hydroxy-3-methyl-diphenyl-amine-carboxylic acid of the probable formula

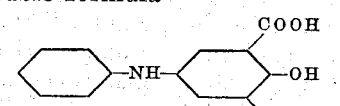

crystallizing from benzene in greenish glittering leaflets of melting point 195–197° C., soluble in organic solvents and in alkalies, difficultly soluble in water, yielding when mixed with a solution of ferric chloride a blue coloration.

8. As a new compound the 4-hydroxy-3.4′-dimethyl-diphenyl-amine-carboxylic acid of the probable formula

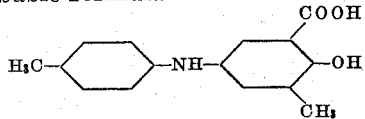

crystallizing from benzene in colorless leaflets of melting point 207–210° C., soluble in organic solvents and in alkalies, difficultly soluble in water, yielding when mixed with a solution of ferric chloride a blue coloration.

In testimony whereof, we affix our signatures.

LEOPOLD LASKA.
OSKAR HALLER.